(12) United States Patent
Monvavage

(10) Patent No.: US 6,702,272 B2
(45) Date of Patent: Mar. 9, 2004

(54) COMPLIANT LOCKING SUPPORT FIXTURE

(75) Inventor: Charles Monvavage, Easton, PA (US)

(73) Assignee: Airline Hydraulics Corp., Bensalem, PA (US)

( * ) Notice: Subject to any disclaimer, the term of this patent is extended or adjusted under 35 U.S.C. 154(b) by 14 days.

(21) Appl. No.: 10/004,599

(22) Filed: Nov. 1, 2001

(65) Prior Publication Data

US 2002/0050672 A1 May 2, 2002

Related U.S. Application Data

(60) Provisional application No. 60/245,141, filed on Nov. 2, 2000.

(51) Int. Cl.[7] ................................................ B25B 11/00
(52) U.S. Cl. .................................................... 269/266
(58) Field of Search ............................... 269/309, 266, 269/289 R, 296, 26; 248/354.2, 354.4; 81/177.2; 83/698.31, 698.91; 76/107.1; 279/22, 30, 76, 79; 72/481.1, 481.6, 481.9, 482.1

(56) References Cited

U.S. PATENT DOCUMENTS

| | | | |
|---|---|---|---|
| 1,453,176 A | | 4/1923 | Perrine |
| 2,754,708 A | | 7/1956 | Peterson |
| 2,882,771 A | | 4/1959 | Blazek |
| 3,589,226 A | * | 6/1971 | Shadowens, Jr. ......... 83/698.31 |
| 4,088,312 A | | 5/1978 | Frosch et al. |
| 4,200,272 A | | 4/1980 | Godding |
| 4,206,910 A | | 6/1980 | Biesemeyer |
| 4,572,564 A | | 2/1986 | Cipolla |
| 4,684,113 A | | 8/1987 | Douglas et al. |
| 4,770,455 A | | 9/1988 | Collins, Jr. |
| 4,838,531 A | | 6/1989 | Corsi |
| 4,936,560 A | | 6/1990 | Barozzi |
| 5,120,033 A | | 6/1992 | Shoda |
| 5,152,707 A | * | 10/1992 | Dougherty et al. ......... 269/266 |
| 5,218,753 A | | 6/1993 | Suzuki et al. |
| 5,364,083 A | | 11/1994 | Ross et al. |
| 5,722,646 A | | 3/1998 | Soderberg et al. |
| 5,738,345 A | | 4/1998 | Schroeder et al. |
| 5,785,473 A | | 7/1998 | Stark |
| 5,788,310 A | | 8/1998 | McKee |
| 5,820,117 A | | 10/1998 | Thompson, Sr. et al. |
| 5,899,446 A | | 5/1999 | Thompson |
| 5,906,364 A | | 5/1999 | Thompson et al. |
| 5,984,293 A | | 11/1999 | Abrahamson et al. |
| 6,069,322 A | | 5/2000 | Thompson |
| 6,199,464 B1 | | 3/2001 | Chua et al. |
| 6,202,999 B1 | | 3/2001 | Wayman et al. |

* cited by examiner

Primary Examiner—Robert C. Watson
(74) Attorney, Agent, or Firm—Duane Morris LLP

(57) ABSTRACT

A pin locking apparatus for use in a support fixture includes a locking plate having a pin receiving hole and a ball receiving hole, and a ball contained within the ball receiving hole. The bottom of the ball receiving hole merges with a lower portion of the pin receiving hole. In a locking position, the ball of the pin locking apparatus is positioned approximately at a bottom of the ball receiving hole, and in an unlocking position, the ball is remote from the bottom of the ball receiving hole. The pin locking plate may be included in individual pin locking modules, which may be added, rearranged or removed from a supporting device. The pin locking plate may also be included in a supporting device wherein the pins are locked and unlocked using vacuum and air pressure, and in a supporting device wherein the pins are locked and unlocked manually by twisting, lifting and lowering the pins.

35 Claims, 9 Drawing Sheets

COMPLIANT LOCKING SUPPORT FIXTURE

This application claims the benefit of U.S. Provisional Patent Application No. 60/245,141, filed Nov. 2, 2000, under 35 U.S.C. §119(e).

FIELD OF THE INVENTION

The present invention relates generally to support fixtures and more specifically to compliant locking support fixtures.

DESCRIPTION OF THE RELATED ART

Support fixtures for propping up workpieces have been widely used in the production of contoured parts from such varying applications as aircraft manufacturing and circuit board manufacturing. Regardless of the workpiece, it is important to be able to hold the piece so that machining or further treatment operations can be performed. Generally, support fixtures for holding articles comprise a device containing vertically disposed adjustable pins or rods and means for securing the pins at a given vertical location. Exemplary support fixtures are described in U.S. Pat. No. 4,200,272 to Godding, U.S. Pat. No. 4,684,113 to Douglas et al., U.S. Pat. No. 5,722,646 to Soderberg et al., and U.S. Pat. No. 5,984,293 to Abrahamson et al.

U.S. Pat. No. 4,200,272 to Godding discloses a work holder comprising a flat horizontal table in which is mounted a two-dimensional array of vertically disposed spaced-apart rods which protrude upwards through the surface. The rods can be moved upwards individually, either manually or by springs or by fluid pressure means such as rams, and then clamped in position so that their tips form a cradle conforming to the shape of the workpiece, in which the workpiece rests.

U.S. Pat. No. 4,684,113 to Douglas et al. discloses a holding fixture which has a contoured holding surface. The fixture includes a plurality of workpiece engaging rods which are individually adjustable in height. A holding force is generated through the rods to hold the workpiece to the fixture.

U.S. Pat. No. 5,722,646 to Soderberg et al. discloses a tooling system having a support table with multiple openings adapted to removably accept a self-contained actuator. Each opening of the support table provides vacuum and air supply lines as well as a bus interface so that each position may be uniquely addressed and commanded separately from any other openings. The self-contained actuator has corresponding connectors for receiving the vacuum and air supply as well as for interfacing with the bus. An actuator may be placed at a particular location by insertion into the receptacle at the opening in the support table aperture. The actuator may be commanded to raise, lower, lock in position and supply vacuum separate from any other actuator.

U.S. Pat. No. 5,984,293 to Abrahamson et al. discloses a fixture for holding printed circuit board assemblies during stencil printing, pick-and-place processing, and other PCB assembly processes. The fixture has a base and a plurality of support members movably attached to the base. The support members may project away from the base along support paths, and the support members are selectively positionable along the support paths when the support members engage a side of a printed circuit board assembly. The support members may be selectively positioned at heights corresponding to a topography of the side of the printed circuit board assembly to uniformly support the printed circuit board assembly.

Some problems with the prior art support fixtures include substantial setup time, the need for operator intervention, and the requirement of expensive or sophisticated controls. A support fixture is desired which is inexpensive and simple to employ and significantly reduces set-up time and operator intervention.

SUMMARY OF THE INVENTION

One aspect of the present invention is a pin locking apparatus for use in a support fixture. The pin locking apparatus includes a locking plate having a pin receiving hole and a ball receiving hole, and a ball contained within the ball receiving hole. The bottom of the ball receiving hole merges with a lower portion of the pin receiving hole. The pin locking apparatus has a locking position wherein the ball is positioned approximately at a bottom of the ball receiving hole, and an unlocking position wherein the ball is remote from the bottom of the ball receiving hole.

Another aspect of the invention is a pin locking module for use in a supporting device. The pin locking module includes an enclosure having a pin receiving hole, a pin locking plate contained within a top of the enclosure and including a pin receiving hole and a ball receiving hole, a piston assembly having a piston and a pin, and a ball which is movably contained within the ball receiving hole. The supporting device for holding the pin locking modules includes a grid plate and a base plate, the grid plate having pin locking module receiving holes, an air channel and an air portal, the base plate having an air channel, a plurality of air holes and an air portal.

A further aspect of the invention is a pin locking apparatus for use in a supporting device, having a pin locking plate with a plurality of pin receiving holes and a plurality of ball receiving holes, and a plurality of balls movably held within the ball receiving holes. The supporting device, according to another aspect of the invention, includes a base plate, a cylinder block having a plurality of piston receiving holes, the pin locking plate, a top plate having pin receiving holes, a plurality of balls contained within the ball receiving holes of the pin locking plate, a plurality of piston assemblies slidably mounted within the piston receiving holes, at least one air pressure channel fluidly connected to the pin receiving holes of the cylinder block, and at least one air conduit fluidly connected to the ball receiving holes of the pin locking plate.

Another supporting device according to the present invention includes a base plate, a plurality of support posts mounted to the base plate, a pin locking plate mounted to the support posts and having a plurality of pin receiving holes and ball receiving holes, a top plate mounted to the pin locking plate and having pin receiving holes, a plurality of balls movably contained within respective ones of the ball receiving holes of the pin locking plate, and a plurality of piston assemblies slidably mounted within the pin receiving holes of the pin locking plate and top plate.

A method for positioning a pin according to the present invention includes the steps of lifting a ball contained within a ball receiving hole of a locking plate towards a top of the ball receiving hole, adjusting a pin slidably engaged within a pin receiving hole of the locking plate to a desired position, the pin receiving hole being positioned adjacent to the ball receiving hole, moving the ball towards a bottom of the ball receiving hole so as to contact the ball to the pin, and locking the pin in a locking position with the ball.

DETAILED DESCRIPTION OF THE PREFERRED EMBODIMENT

Figure 1A:
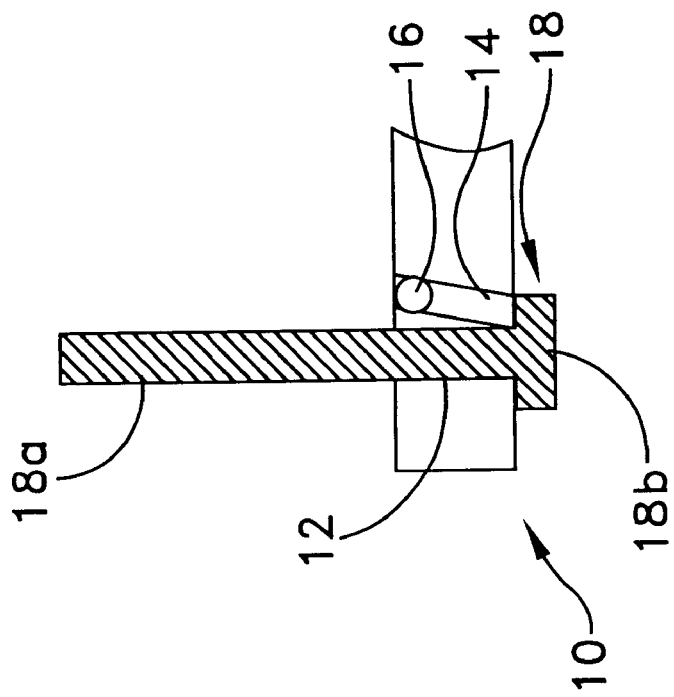
FIGS. 1a and 1b are front cross-sectional views of a locking plate of the present invention showing a locked and an unlocked position, respectively.
Figure 1B:
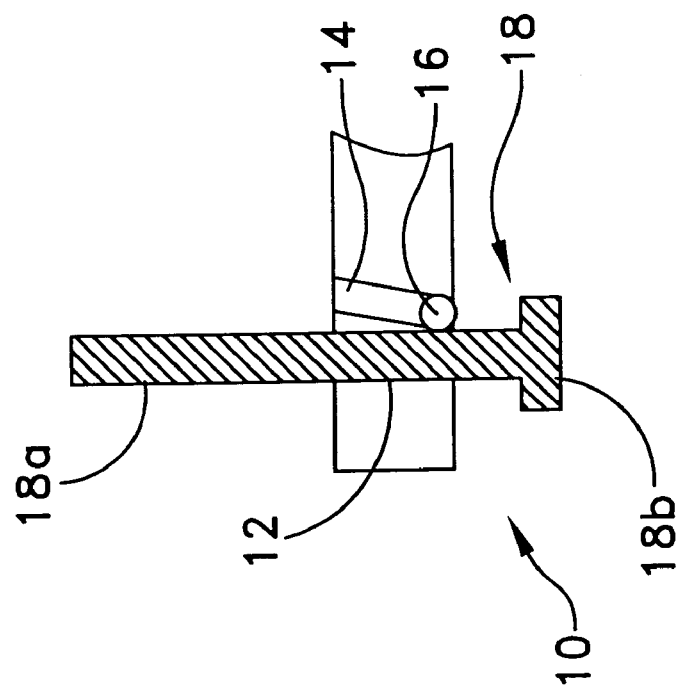

FIGS. 1a and 1b show a portion of an exemplary locking plate 10. Locking plate 10 has a pin receiving hole 12 for retaining a pin 18a, a ball receiving hole 14 for retaining a ball, and a ball 16 which is retained within ball receiving hole 14. Pin 18a is part of a piston assembly 18 comprising pin 18a and piston 18b. Pin receiving hole 12 is substantially vertical and ball receiving hole 14 is drilled at an angle with respect to pin receiving hole 12, the bottom of ball receiving hole 14 merging with a lower portion of pin receiving hole 12. The lower portion of pin receiving hole 12 may be at or near to the bottom of pin receiving hole 12. Pin receiving hole 12 slidably engages pin 18a.

Locking plate 10 has a locking position as shown in FIG. 1a and an unlocking position as shown in FIG. 1b. In the locking position, ball 16 is at or near a bottom of ball receiving hole 14. In the locking position, ball 16 contacts pin 18a which is retained within pin receiving hole 12. In this position, ball 16 is wedged against the pin, which locks the pin securely in position. Pressure on pin 18a from above, such as the weight of an object being held, serves to lock pin 18a in position more tightly as it causes the pin to be wedged more tightly against ball 16. In the unlocking position, ball 16 is away from the bottom of ball receiving hole 14 such that ball 16 is not contacting pin 18a. Preferably, when ball 16 is in the locking position, ball 16 protrudes from the bottom surface of locking plate 10. Consequently when piston 18b is fully upwardly extended, it presses against ball 16, lifting it upwards, and thereby dislodging ball 16.

Locking plate 10 is preferably made from a material with a hardness greater than that of ball 16 and pin 18 so that surfaces are not damaged when ball 16 is wedged between pin 18 and angled ball receiving hole 14. The thickness of locking plate 10 is preferably at least sufficient so that ball 16 can move from a locked position to an unlocked position and so that sufficient stability and guidance is provided to pin 18a when extending.

Ball 16 is preferably made of a hard material such as steel. The diameter of ball 16 is preferably smaller than the diameter of pin 18a. There should be sufficient clearance between ball 16 and ball receiving hole 14 so that ball 16 may move freely.

Piston assembly 18 may include one piece with two different diameters, pin 18a having a smaller diameter than piston 18b. Alternatively, piston assembly 18 may include two separate pieces that are pressed or otherwise mated together. Piston assembly 18 should be made of a hard material so that it is not damaged by ball 16 being wedged against it when in a locking position, and so that piston assembly 18 is rigid enough to support a workpiece.

Figure 2:
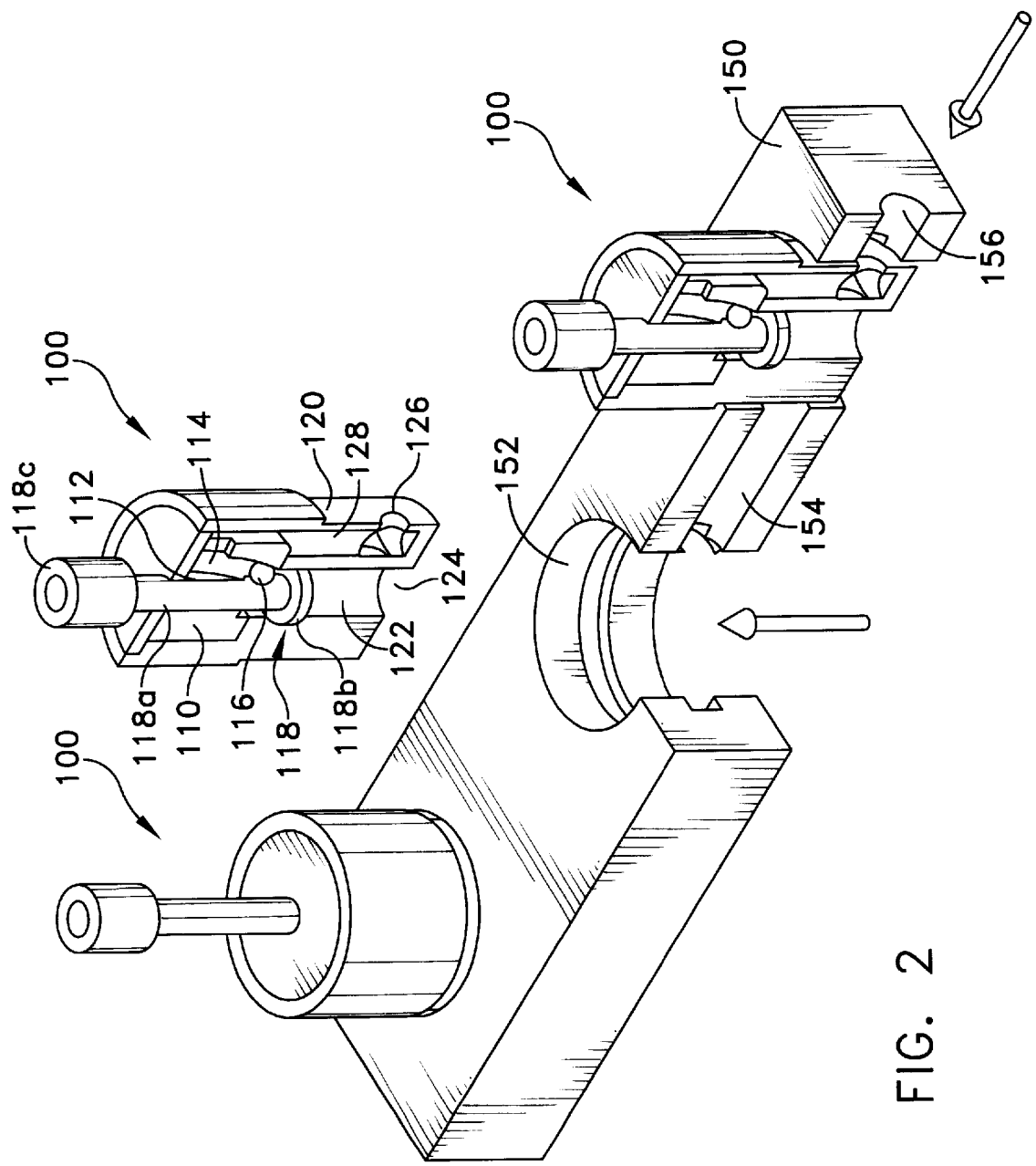
FIG. 2 is a partial cross-sectional view of pin locking modules according to one aspect of the present invention.

FIG. 2 shows pin locking modules 100, which incorporate pin locking plate 10 as described above. Modules 100 can be added, rearranged, or removed to support different objects, providing great flexibility. Pin locking module 100 has a pin locking plate 110, a ball 116, a piston assembly 118, and an enclosure 120. Pin locking plate 110 has a pin receiving hole 112 and a ball receiving hole 114. Pin receiving hole 112 is substantially vertical and ball receiving hole 114 is drilled at an angle to pin receiving hole 112, the bottom of ball receiving hole 114 merging with a lower portion at, or near the bottom of, pin receiving hole 112. In a locking position, ball 116 is located at a bottom of ball receiving hole 114. In an unlocking position, ball 116 is located away from the bottom of ball receiving hole 114.

Piston assembly 118 includes a pin 118a and a piston 118b. Pin 118a is slidably received in pin receiving hole 112. Preferably, pin 118a includes a cap 118c made of a soft material, such as plastic or a compliant rubber material, for supporting an object, especially in applications where there is a chance of marking or otherwise damaging the workpiece. Ball 116 is movably retained within ball receiving hole 114.

Enclosure 120 contains a piston receiving channel 122, a first opening 124, a second opening 126 and an air channel 128. Piston receiving channel 122 is a vertically bored hole for slidably engaging piston 118b of the piston assembly 118. First opening 122 passes through a bottom surface of the enclosure 120 and acts to allow entry of air pressure to the piston receiving channel 122 to lift piston assembly 118. Second opening 126 passes through a side of enclosure 120 towards the bottom and allows entry of air pressure or vacuum to ball receiving hole 114. Air channel 128 is fluidly connected to second opening 126 and extends vertically through a side wall of enclosure 120 and is fluidly connected to ball receiving hole 114 of pin locking plate 110. Enclosure 120 is preferably cylindrical in shape, although any shape may be used, and encloses and retains pin locking plate 110 at an upper portion of enclosure 120. Alternatively pin locking plate may be integral with the upper portion of enclosure. Preferably the bottom portion of enclosure 120 is threaded on the outside surface.

Figure 3:
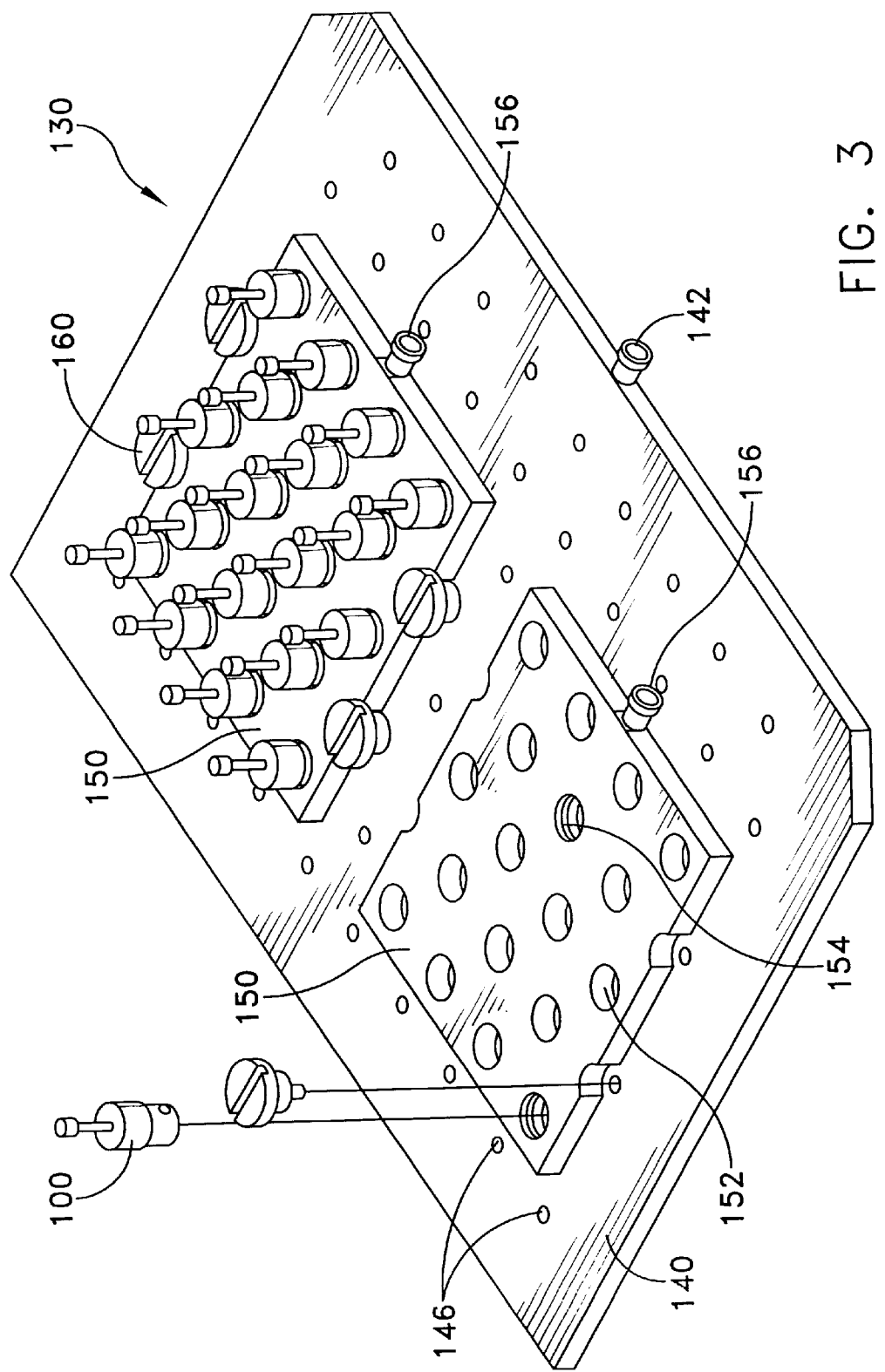
FIG. 3 is a top isometric view of a supporting device according to one aspect of the present invention.

FIG. 3 shows a supporting device 130 for supporting articles including the pin locking modules 100 as described above. Supporting device 130 includes a base plate 140, at least one grid plate 150 and one or more pin locking modules 100. Note that grid plate 150 can have a single row of pin locking modules 100, or any number of rows of modules 100. Also, a plurality of devices 130, each having a single row, can be placed alongside each other to form a two-dimensional support grid.

Base plate 140 includes an air portal 142, an air pressure channel (not shown) and a plurality of air holes 146. Air portal 142 is located on an outside surface of base plate 140 for attachment to an air pressure source. The air pressure channel lies inside the base plate 140 and fluidly connects air portal 142 to the plurality of air holes 146. The plurality of air holes 146 are fluidly connected to first openings 124 of enclosure 120 of pin locking modules 100. An air pressure source (not shown) is fluidly connected to air portal 142 and provides air pressure for lifting pins 118a to a desired position.

At least one grid plate 150 is mounted on base plate 140 and has pin locking module receiving holes 152, an air channel 154 and an air portal 156. Air channel 154 lies inside grid plate 150 and is cut all the way around module receiving holes 152. Air channel 154 fluidly connects air portal 156 to second openings 126 of enclosures 120 of modules 100. Air portal 156 is fluidly connected to an air pressure/vacuum source. Module receiving holes 152 are preferably threaded for receiving threads on bottom portion of pin locking modules 100.

Supporting device 130 preferably also includes one or more plugs (not shown) for plugging air holes 146 of base plate 140 which are not being used to operate pin locking modules. These plugs may be, for example, nylon screws or hex bolts.

Supporting device 130 also preferably includes screws 160 for mounting grid plate 150 to base plate 140. Screws 160 are preferably threaded for insertion onto the threads of the module receiving holes 152. Location of grid plates 150 can be varied according to the application by simply mounting the grid plates in a different location on base plate 140.

Supporting device 130 is preferably operated automatically. Referring to FIGS. 2 and 3, vacuum is applied to ball receiving holes 114 of pin locking plate 110 via air portal 156 and air channel 154 of grid plate 150 and second openings 126 of enclosure 120. At the same time, a number of short shots of high pressure air is introduced into piston receiving channel 122 via first openings 124 of enclosures 120 through air portal 142, air pressure channel 144 and air holes 146. All of the pistons are raised until pistons 118b and the vacuum dislodge balls 116. This releases the balls from the locking position. To lock the pins into position for securing a workpiece, low pressure air from an air pressure source (not shown) is introduced through air portal 142 and through air pressure channel 144 and air holes 146 into first openings 124 of enclosure 120 of pin locking module 100. When this low pressure is applied to first openings 142, piston assemblies 118 are raised until the top of each pin 118a meets an individual surface of the workpiece to be supported. While this low pressure is maintained, air pressure is supplied to ball receiving holes 114 of pin locking plate 110 via second openings 126 and air channel 128 of enclosure 120, and air portal 156 and air channel 154 of grid plate 150. Ball 116 then locks pin 118a in a locking position. The air pressure supplied to the ball receiving holes and the piston receiving channel may then be discontinued.

Figure 4:
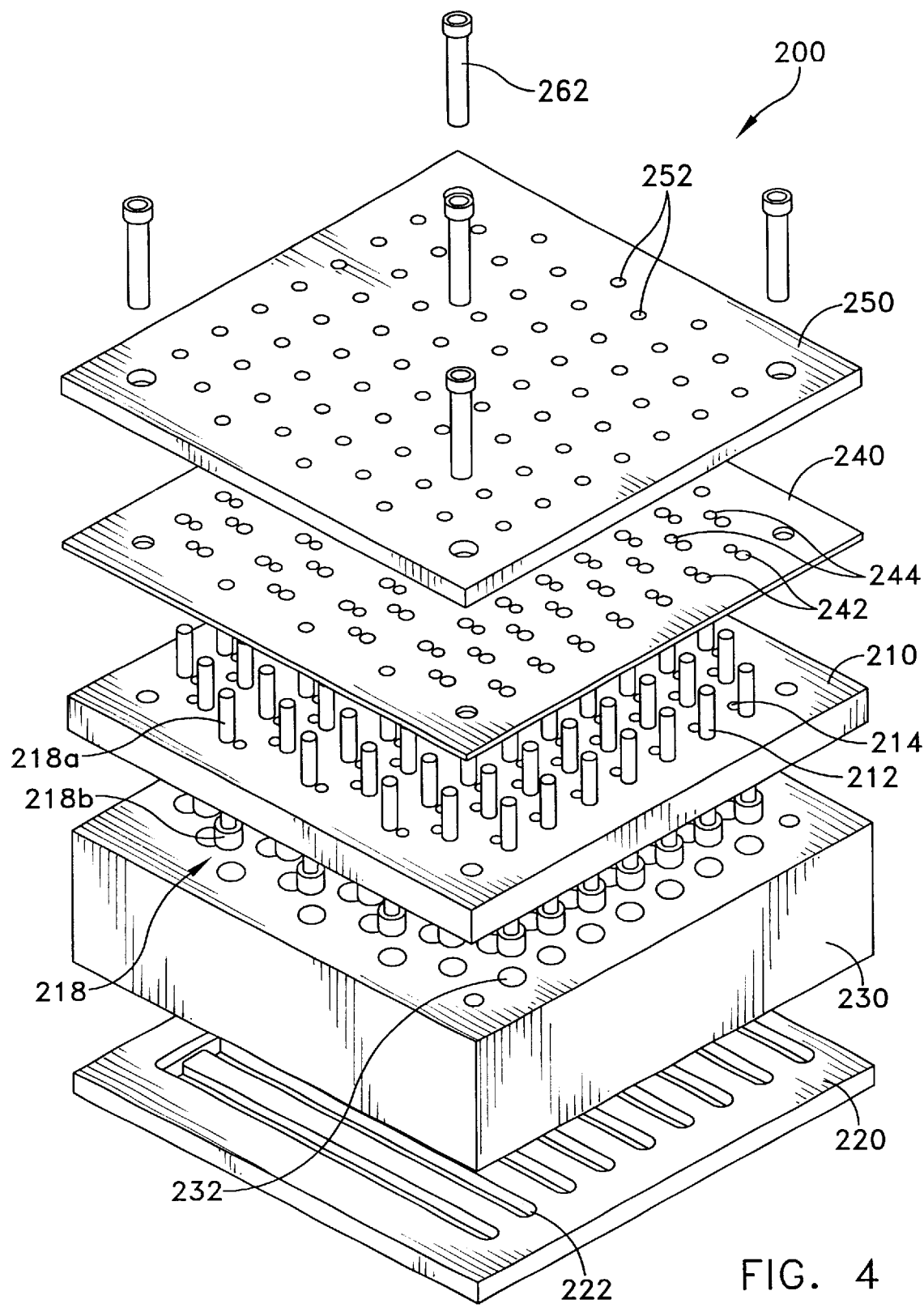
FIG. 4 is an exploded top isometric view of a supporting device according to another aspect of the present invention.
Figure 5:
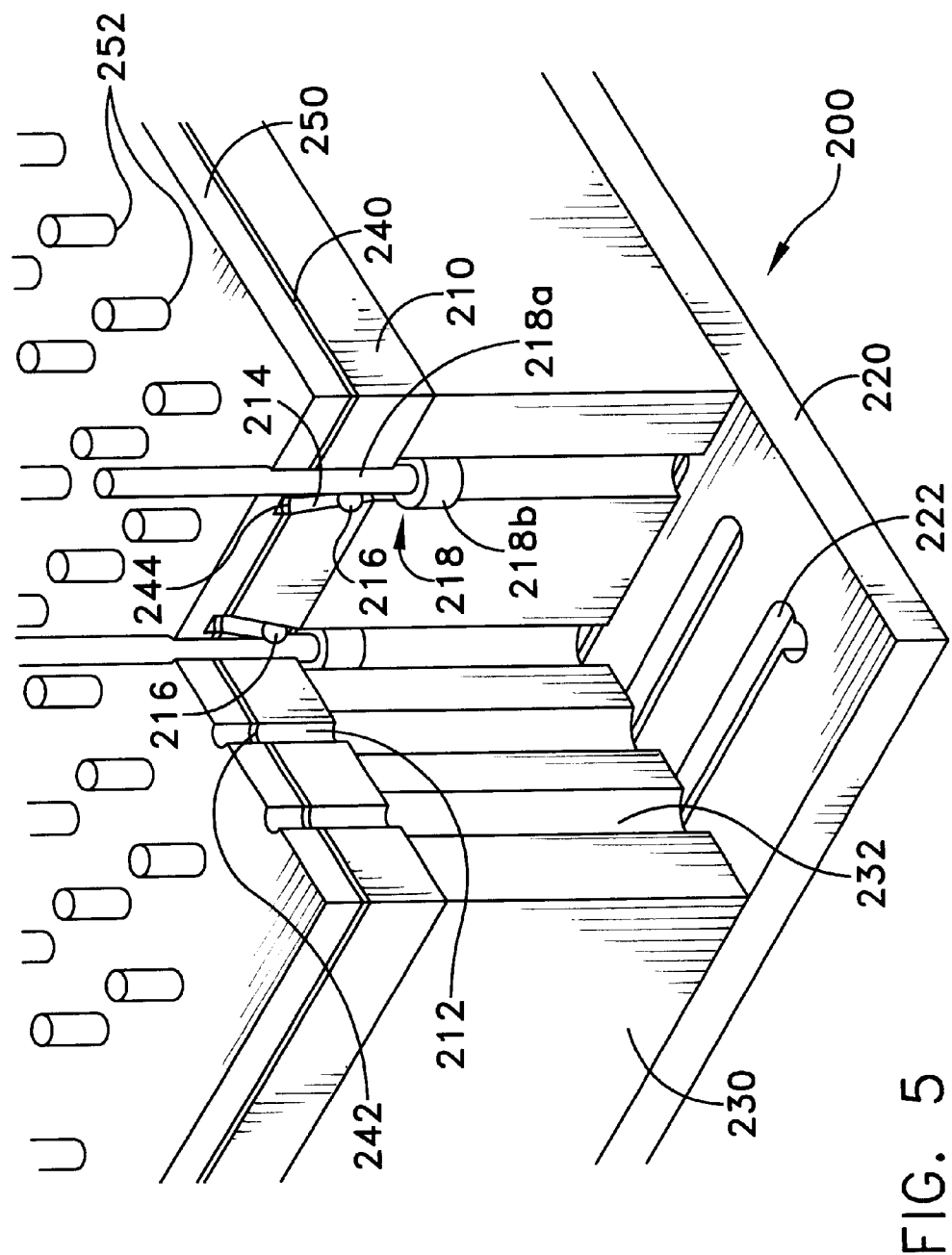
FIG. 5 is a top isometric view of the supporting device of FIG. 4 shown in partial cross-section.

FIG. 4 shows another embodiment of a supporting device. Supporting device 200 includes a pin locking plate 210, a base plate 220, a cylinder block 230, a gasket 240, a top plate 250, a plurality of balls 216, and a plurality of piston assemblies 218 which include a pin 218a and a piston 218b.

Base plate 220 serves as a mounting platform for supporting device 200. As shown in FIG. 4, base plate 220 includes at least one air pressure channel 222 located on a top surface of base plate 220. Alternatively, at least one air pressure channel may lie inside the base plate and terminate in a plurality of air holes on the surface of the base plate as is partially depicted in FIGS. 6 and 7. Air pressure channel 222 is fluidly connected to an air portal (not shown) located at an outside surface of base plate 220 for fluid connection to an air pressure source. (Alternatively, the cylinder block 230 may contain at least one air pressure channel having an air portal at an outside surface for fluid connection to an air pressure source.) Base plate 220 also serves as a cap for the cylinder block 230 to retain the piston assemblies 218 in cylinder block 230. Preferably, the base plate is made of aluminum, but may be made of any suitable material.

Cylinder block 230 is mounted to base plate 220. Cylinder block 230 has a plurality of vertically bored piston receiving holes 232. The diameter of these holes 232 correspond to the diameter of piston 218b and is sized so that a certain amount of air may pass by the piston 218b which is movably retained in piston receiving holes 232. Holes 232 of cylinder block 230 are fluidly connected to air pressure channel 222 of base plate 220. Alternatively, cylinder block 230 may contain at least one air channel fluidly connected to holes 232. Preferably, cylinder block 230 is made of aluminum, but may be made of any suitable material.

Pin locking plate 210 is mounted to a top of cylinder block 230. Pin locking plate 210 includes a plurality of pin receiving holes 212 and a plurality of ball receiving holes 214. Pin receiving holes 212 are substantially vertical and ball receiving holes 214 are drilled at an angle to pin receiving holes 212, the bottom of ball receiving holes 214 merging with a lower portion of pin receiving holes 212 at or near the bottom of the pin receiving holes. Balls 216 are movably retained within ball receiving holes 214. Pin receiving holes 212 of pin locking plate 210 are aligned with piston receiving holes 232 of cylinder block 230.

Pin locking plate 210 is preferably made from material with a hardness greater than that of balls 216 and pins 218a so that surfaces are not damaged when ball 216 is wedged between the pin 218a and angled ball receiving hole 214. Such a material is preferably hardened tool steel (A2 or O1) but may be any suitable material. Ball 216 is preferably comprised of steel, but may be comprised of any suitable material. Thickness of pin locking plate 210 is preferably sufficient enough so that ball 216 can move from a locked position to an unlocked position and so that sufficient stability and guidance is provided to pin 218a when extending.

Gasket 240 is mounted to pin locking plate 210. Gasket 240 has a plurality of pin receiving holes 242 which are aligned with pin receiving holes 212 of pin locking plate 210, and a plurality of ball retaining holes 244 which are aligned with ball receiving holes 214 of pin locking plate 210. Ball retaining holes 244 allow vacuum or air pressure to be distributed to ball receiving holes 214 of pin locking plate 210 for the purpose of locking and unlocking balls. Preferably, gasket 240 is made from a thin, rigid material such as flat steel. Ball retaining holes 244 are sized so that they are slightly smaller than the diameter of balls 216. Thus, gasket 240 provides a surface to which balls 216 are drawn when in an unlocking position, and thereby, retains balls 216 in angled ball receiving holes 214 of pin locking plate 210. In an alternative embodiment, supporting device 200 does not contain a gasket, but rather ball receiving holes 214 of pin locking plate 210 have a reduced diameter at the surface of pin locking plate 210 for retaining balls 216 in ball receiving holes 214. Preferably, the gasket is made of tool steel, but may be made of any suitable material.

Top plate 250 is mounted to gasket 240. Top plate 250 holds gasket 250 and pin locking plate 210 in alignment with cylinder block 230. Top plate 250 has a plurality of pin receiving holes 252 (see FIGS. 6 and 7) which are aligned with pin receiving holes 242 of gasket and pin receiving holes 212 of pin locking plate 210. Pin receiving holes 252 of top plate 250 slidably engage pins 218a of piston assemblies 218.

Top plate 250 preferably contains at least one air conduit 254 (see FIGS. 6 and 7) which is fluidly connected to ball receiving holes 216 of pin locking plate 210 via ball retaining holes 244 of gasket 240. Air conduit 254 channels vacuum or air pressure to ball receiving holes 216 of pin locking plate 210. Air conduit 254 has an air portal (not shown) located at an outside surface of top plate 250. Air portal is fluidly connected to an air pressure/vacuum source (not shown) for controlling the locking and unlocking of ball 216 in ball receiving holes 214. Alternatively, pin locking plate 210 may contain at least one air conduit and air portal which fluidly connects an upper portion of ball receiving holes 214 to an air pressure/vacuum source. Preferably, top plate 250 is comprised of aluminum, but may be comprised of any suitable material.

Piston assemblies 218 each include a pin 218a and a piston 218b. Pins 218a are slidably engaged in pin receiving holes of pin locking plate 210, gasket 240 and top plate 250. Preferably, pins 218a include a cap 218c (see FIGS. 6 and 7) made of a soft material, such as plastic or a compliant rubber material, for supporting an object, especially in applications where there is a chance of marking or otherwise damaging the workpiece. Piston 218b is slidably retained in piston receiving holes 232 of cylinder block 230. Piston assembly 218 may consist of one piece with a different diameter for pin 218a and piston 218b, or two separate pieces that are mated together. Piston assembly 218 is preferably made from a hard material such as steel so that it is not damaged by the ball being wedged against it. The material preferably should also be rigid so that is provides adequate support to the workpiece.

Figure 6:
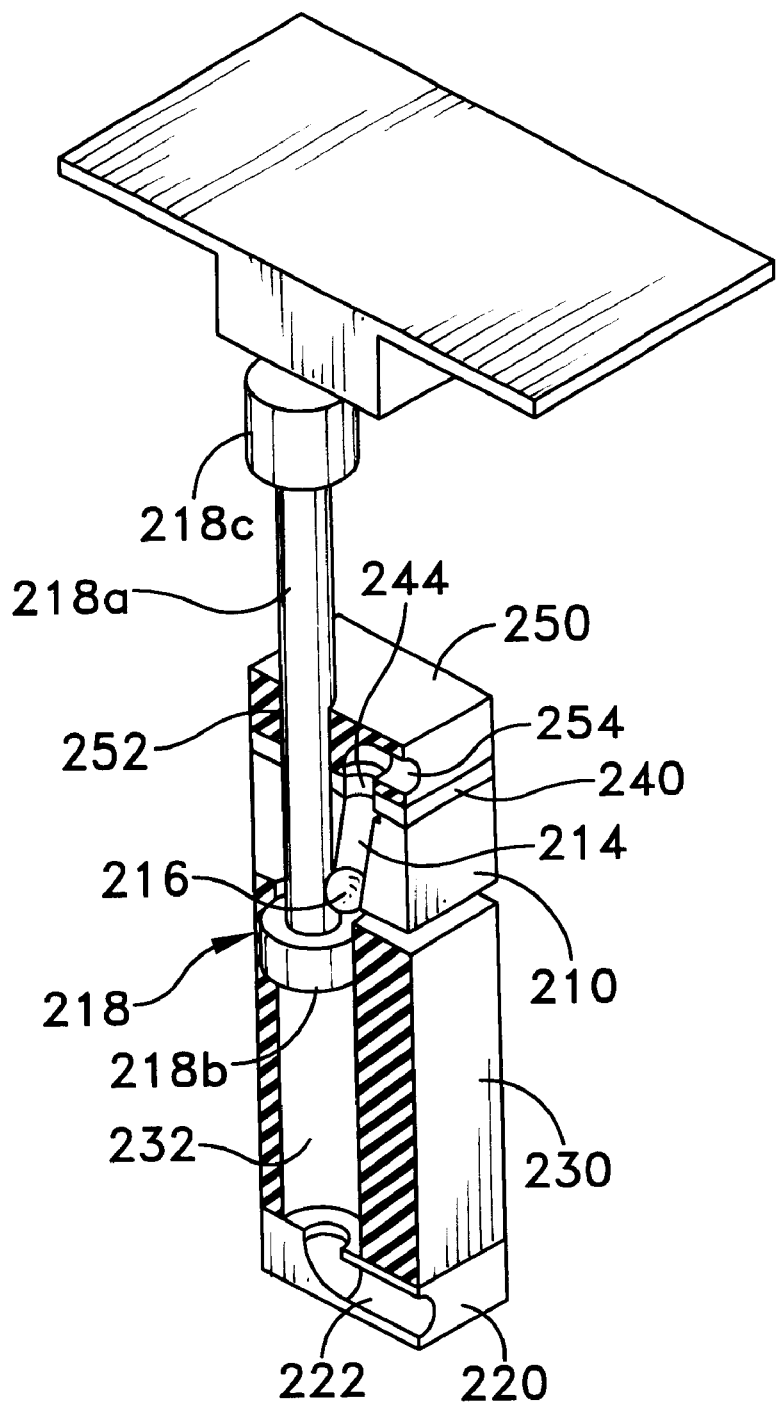
FIGS. 6 and 7 are partial front cross-sectional views of the supporting device of FIG. 4 indicating set and reset positions, respectively.
Figure 7:
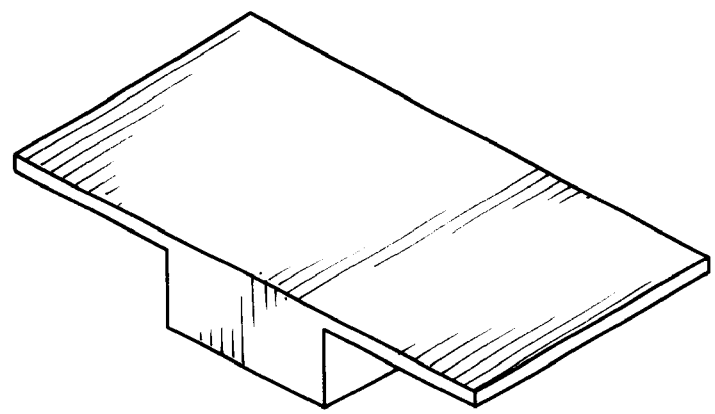
Figure 7:
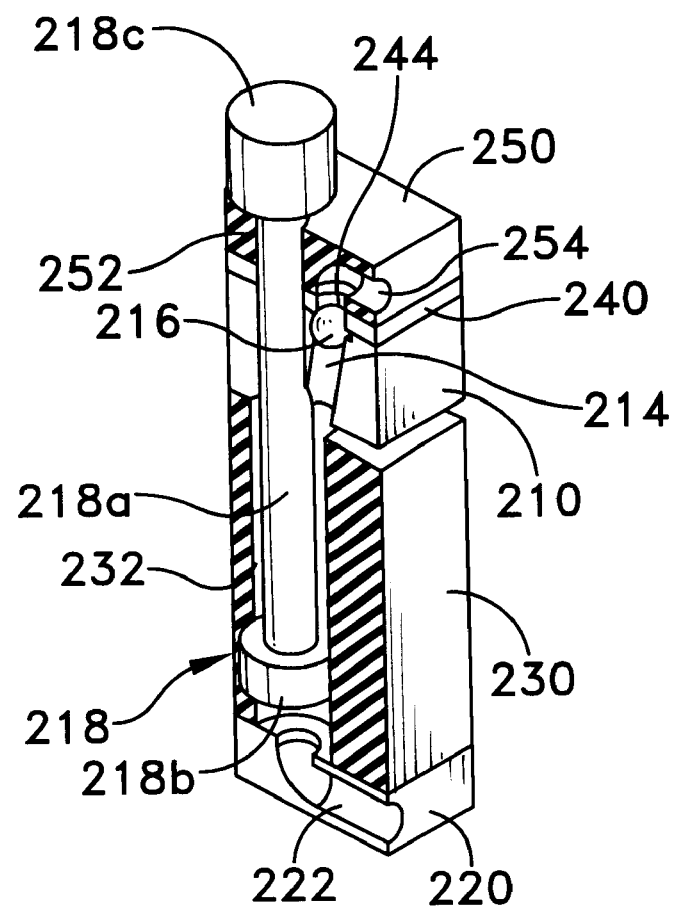
Figure 8:
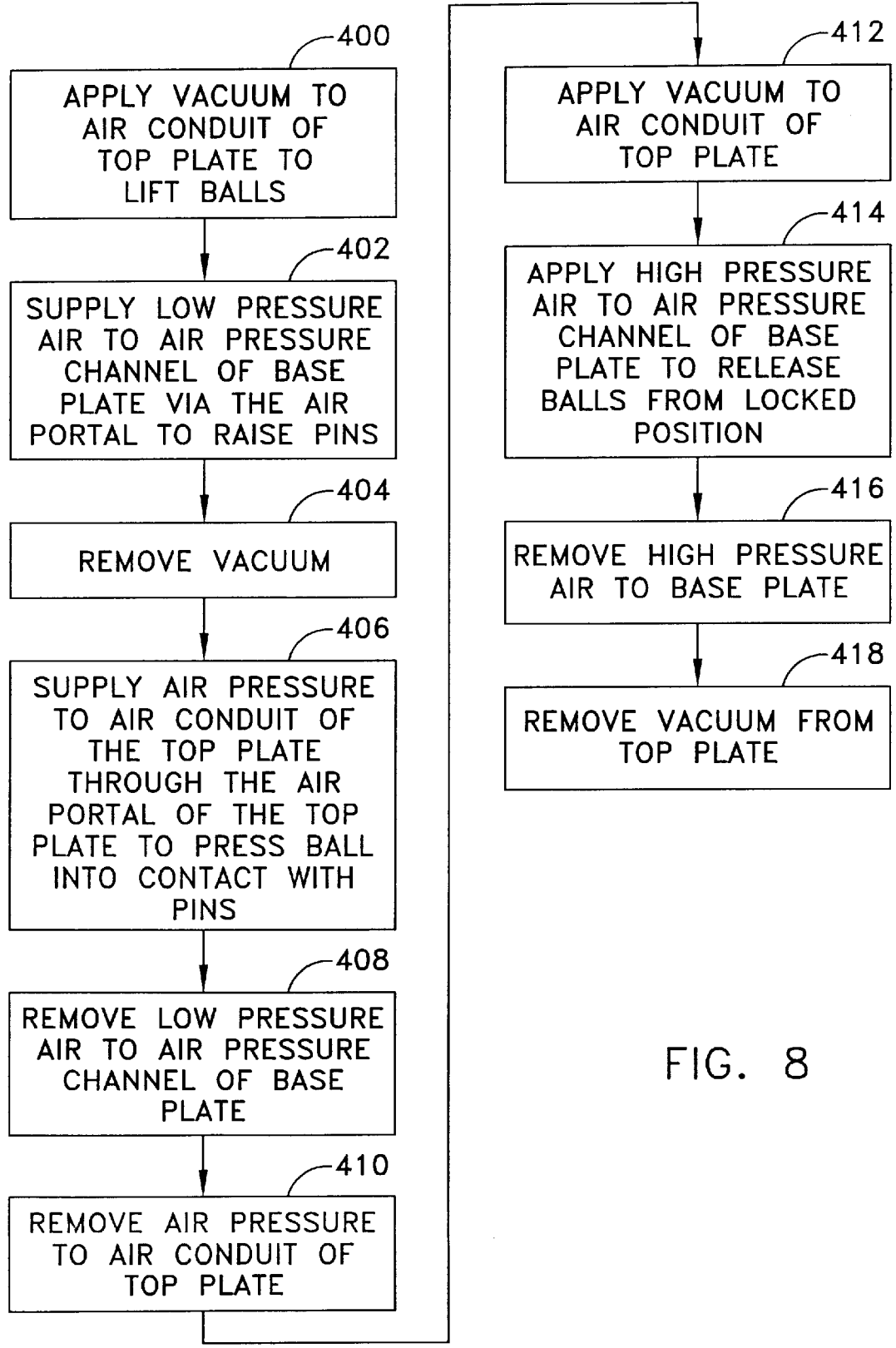
FIG. 8 is a flow chart depicting the steps of locking and unlocking pins in a pin locking plate.

As depicted in partial cross-section in FIGS. 6 and 7, the separate pieces of supporting device 200 are mounted together. In a preferred embodiment, top plate 250, gasket 240, pin locking plate 210, cylinder block 230 and base plate 220 contain mounting holes 260 whereby fasteners 262 such as screws or dowel pins, for example, are inserted to securely fasten the pieces together.

Supporting device 200 is fluidly connected via air portals 224 and 256 to at least one air pressure source and vacuum source (not shown). Supporting device may be operated manually by activating individual valves which supply air pressure or vacuum to air pressure channel 222 and air conduit 254. Preferably, supporting device is operated by a programmable controller (not shown). The controller contains the valve configuration which is sequentially controlled by a program.

Referring to FIGS. 5–8, another aspect of the invention is a method for using the supporting device 200 to support a workpiece. The method includes the steps of: lifting the balls contained within ball receiving holes 214 of pin locking plate 210 towards a top of ball receiving hole; adjusting pins 218a slidably engaged within pin receiving holes 212 of pin locking plate 210 to individual desired positions; moving balls 216 towards a bottom of ball receiving holes 214 so as to contact the balls to the pins; and locking pins 218a in a locking position with the ball.

The step of lifting the balls 400, which unlocks the pins to allow them to be lifted to the desired support position, is preferably performed by applying a vacuum to the air conduit 254 of top plate 250. Vacuum is supplied via a vacuum source which is fluidly connected to air conduit 254 of top plate 250 and ball receiving holes 214 of pin locking plate 210 through air portal 256 of top plate 250. The vacuum lifts balls 216 away from a bottom of ball receiving holes 214 and into an unlocking position.

At step 402, after the ball lifting step, low pressure air is supplied through an air pressure source to air pressure channel 222 of base plate 220 via air portal 224. Air flows through air pressure channel 222 and into the bottom of piston receiving holes 232 of cylinder block 230. Pressure should be just enough to raise piston assemblies 218 lightly until pins 218a individually contact surfaces of the object to be supported. Once pins 218a are in their individual desired locations and while low pressure air is still being supplied to air pressure channel 222, at step 404, vacuum is shut off. Thereafter, at step 406, air pressure is applied by an air pressure source to air conduit 254 of top plate 250 through air portal 256. Air flows through air conduit 254 and through ball restricting holes of gasket 240, into the top of ball receiving holes 214 of pin locking plate 210. This presses balls 216 in ball receiving holes 214 downward and into contact with pins 218a. At step 408, the low pressure air being supplied to air pressure channel 222 is then removed and pins 218a are locked in a locking position. At step 410, air pressure to air conduit 254 is then shut off.

The method for unlocking pins at the end of an operation or to prepare device 200 for another operation supporting a different device, includes raising balls 216 and dropping piston assemblies 218. At steps 412 and 414, the balls 216 are raised by applying a vacuum through air portal 256 to air conduit 254 of top plate 250, and thus to ball receiving holes 214 of pin locking plate 210, and simultaneously applying high pressure air through air portal 224 and air pressure channel 222 to bottom of piston receiving holes 232 of base plate 220. The high air pressure pushes piston assemblies 218 upward thereby loosening balls 216 from their locked position. While piston assemblies 218 are being pushed upwards, balls 216 are being drawn to gasket 240 by vacuum applied to air conduit 254. At step 416, once all of pins 218a have been unlocked and balls 216 are against gasket 240, high air pressure may be removed and piston assemblies 218 allowed to drop. Thereafter, at step 418, vacuum may be removed from air conduit 254, allowing balls 216 to drop.

The above method for using supporting device 200 may be operated manually by manually activating individual valves connecting the air pressure source or sources and the vacuum source to the device, or by a programmable controller that automatically actuates the valves according to the sequence of the method steps as described above.

Figure 9:
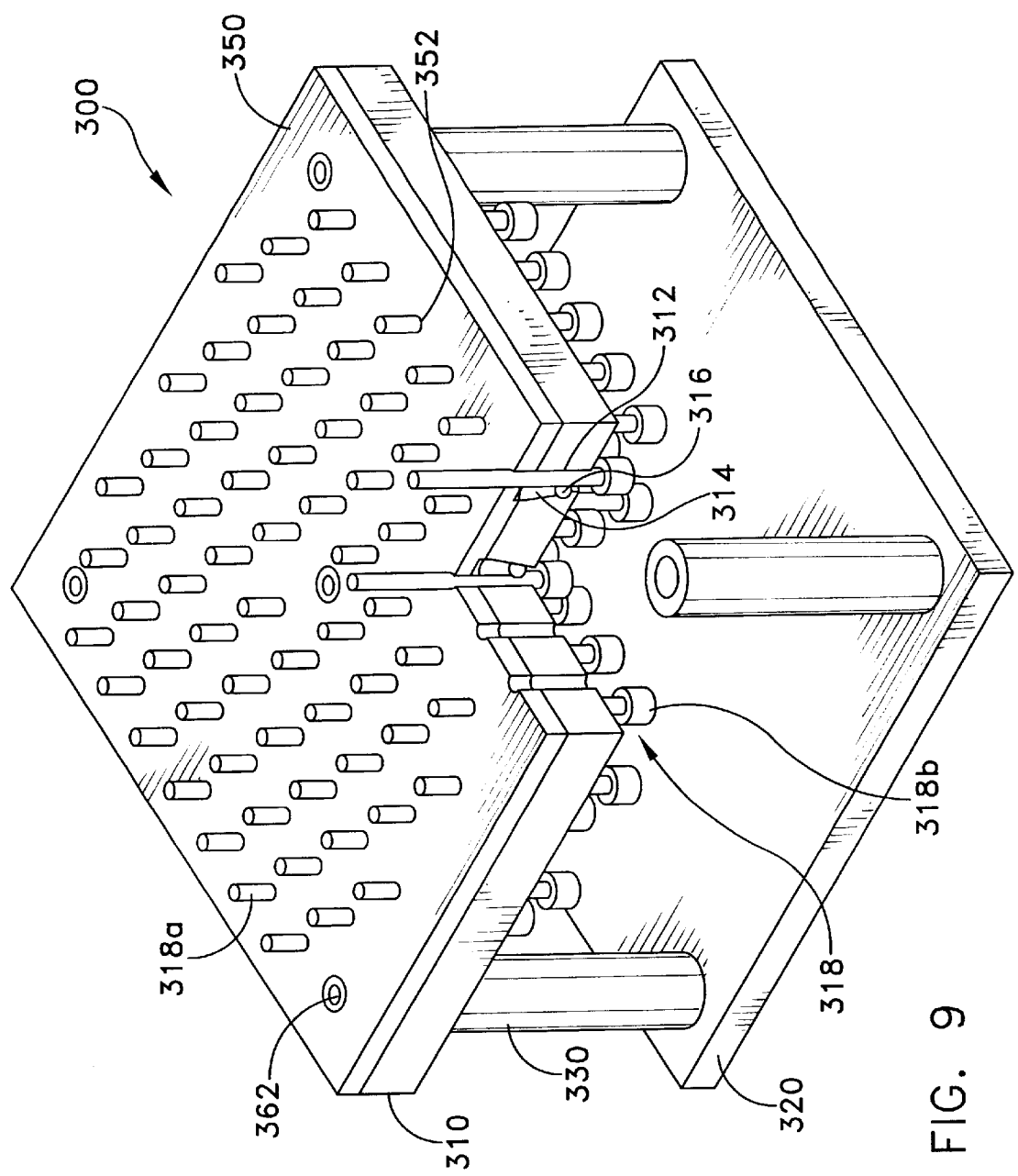
FIG. 9 is a top isometric view of supporting device according to a third aspect of the present invention.

FIG. 9 shows another embodiment of a supporting device 300 according to the present invention. Supporting device 300 includes a pin locking plate 310, a base plate 320, support posts 330, a top plate 350, a plurality of piston assemblies 318 each having a pin 318a and a piston 318b, and a plurality of balls 316.

Base plate 320 serves as a mounting platform for supporting device 300. Support posts 330 are mounted to base plate 320.

Pin locking plate 310 is mounted to support posts 330. Pin locking plate 310 includes a plurality of pin receiving holes 312 and a plurality of ball receiving holes 314. Pin receiving holes 312 are substantially vertical and ball receiving holes 314 are drilled at an angle to pin receiving holes 312, the bottom of ball receiving holes 314 merging with a lower portion of pin receiving holes 312. Balls 316 are movably retained within ball receiving holes 314.

Pin locking plate 310 is preferably made from material with a hardness greater than that of balls 316 and pins 318a so that surfaces are not damaged when balls 316 are wedged between pins 318a and angled ball receiving holes 214. The thickness of pin locking plate 310 is preferably at least enough so that balls 316 may move from a locked position to an unlocked position and so that sufficient stability and guidance is provided to the pins 318a when extending.

Top plate 350 is mounted to pin locking plate 310. Top plate 350 secures the pin locking plate 310 to support posts 330. Top plate 350 has a plurality of pin receiving holes 352 which are aligned with pin receiving holes 312 of pin locking plate 310. Pin receiving holes 352 of top plate 350 slidably receive the pins 318a of piston assemblies 318.

Piston assemblies 318 each include a pin 318a and a piston 318b. Pins 318a are slidably received in pin receiving holes of pin locking plate 310 and top plate 350. Preferably, pins 318a include a cap 318c made of a soft material for supporting an object. Piston assembly 318 may consist of one piece with a different diameter for pin 318a and piston 318b, or two separate pieces that are mated together. Piston assembly 318 is preferably made from a hard material such as steel so that it is not damaged by ball being wedged against it. The material is should also be sufficiently rigid so that is provides adequate support to the workpiece.

As shown in FIG. 9, separate pieces of supporting device 300 are mounted together. In a preferred embodiment, top plate 350, pin locking plate 310, support posts 330 and base plate 320 contain mounting holes 360 whereby fasteners 362 such as screws or dowel pins, for example, are inserted to securely fasten the pieces together.

The embodiment as shown in FIG. 9 is a manual embodiment wherein each piston assembly 318 may be individually adjusted to a desired height. The opening between base plate 320 and pin locking plate 310 afforded by height of support posts 330 provides a working space for manually inserting and adjusting individual pins 318a.

To adjust pins to the individual desired heights for supporting respective surfaces of an object, pins 318a are inserted into a bottom of pin locking plate 310 and through pin receiving holes 312 of pin locking plate 310. Piston assemblies 318 are manually twisted about their longitudinal axes when inserting pins 318a to prevent balls 316 from locking pins 318a. When the desired height is reached, pin 318a is released and pin 318a is thereby locked in locking position by ball 316. To release pin 318a from the locked position, piston assembly 318 is lifted while simultaneously being twisted. Twisting releases ball 316 from the locking position. Pin 318a may then be lowered by again twisting piston assembly 318 and lowering piston assembly 318. By twisting the piston assembly 318, ball 316 is prevented from relocking pin 318a.

The exemplary embodiments as described above, each including a locking plate, are advantageous. They can be raised with light pressure, avoiding damage to the supported object. Once raised, they firmly support the object or workpiece by placing each individual pin in contact with a respective surface of the object and locking each pin rigidly. Unlike other support fixtures which have pins or rods that can slip under pressure, the design of the locking plate of the present invention causes the pins to be locked more tightly with increasing pressure on the pins. Further, the above embodiments are relatively simple in design and cost effective to manufacture. They also consist of few moving or wearing parts.

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention.

What is claimed is:

1. A pin locking apparatus for use in a supporting device, comprising:

a locking plate having a pin receiving hole and a ball receiving hole, and a ball movably contained within said ball receiving hole, and wherein a bottom of the ball receiving hole merges with a lower portion of the pin receiving hole, and wherein the pin locking apparatus has a locking position for locking a pin at a desired height and an unlocking position, and wherein the ball protrudes from a bottom surface of the locking plate when the ball is in the locking position and is remote from the bottom of the ball receiving hole in the unlocking position.

2. The pin locking apparatus of claim 1, wherein the pin receiving hole is substantially vertical and the ball receiving hole is angled with respect to the pin receiving hole.

3. The pin locking apparatus of claim 1, wherein the locking plate is made from a material with a hardness greater than that of the ball or of a pin being locked.

4. The pin locking apparatus of claim 1, wherein the ball has a diameter that is smaller than a pin being held.

5. The pin locking apparatus of claim 1, further comprising a gasket having a pin receiving hole and a ball restricting hole, wherein:

the pin receiving hole of the gasket is aligned with the pin receiving hole of the locking plate, the ball restricting hole of the gasket is aligned with a top of the ball receiving hole of the locking plate, and the ball restricting hole of the gasket is aligned with a top of the ball receiving hole of the locking plate, and the ball restricting hole of the gasket has a smaller diameter than the ball so as to retain the ball in the ball receiving hole of the locking plate.

6. The pin locking apparatus of claim 1, further comprising a pin, wherein the pin is slidably engaged by the pin receiving hole of the locking plate.

7. The pin locking apparatus of claim 6, wherein the pin has a cap comprising a material softer than that of the object being supported.

8. A pin locking module, comprising:

an enclosure having a pin receiving hole;

a pin locking plate contained within a top of the enclosure and including a pin receiving hole and a ball receiving hole, a bottom of the ball receiving hole merging with a lower portion of the pin receiving hole, and the pin receiving hole of the pin locking plate aligned with the pin receiving hole of the enclosure;

a piston assembly including a piston and a pin, the pin slidably engaged by the pin receiving hole of the pin locking plate and enclosure; and a ball movably contained within the ball receiving hole of the pin locking plate.

9. The pin locking module of claim 8, wherein the enclosure includes at least one air opening for the introduction of air pressure or vacuum.

10. The pin locking module of claim 8, wherein the pin locking module is included in a supporting device comprising:

a base plate; and a grid plate mounted on the base plate and having pin locking module receiving holes; and wherein the pin locking module is mounted within one of the pin locking module receiving holes.

11. The supporting device of claim 10, wherein the base plate further comprises an air portal, an air pressure channel and a plurality of air holes, and wherein the grid plate further comprises an air channel and an air portal, and wherein the pin locking modules further comprise a first and second opening, and wherein the first opening of the pin locking module is fluidly connected to the air holes, air pressure channel and air portal of the base plate, and wherein the second opening of the pin locking modules is fluidly connected to the air channel and air portal of the grid plate.

12. The supporting device of claim 11, further comprising a plurality of plugs, wherein the plugs fit into the air holes of the base plate which are not operating pin locking modules.

13. The supporting device of claim 10, further comprising a plurality of screws for mounting the grid plate to the base plate.

14. A pin locking apparatus, comprising:
   one or more pin locking plates, the one or more pin locking plates having a plurality of pin receiving holes and a plurality of ball receiving holes,
   a plurality of balls movably contained within respective ones of said ball receiving holes, and
   a plurality of piston assemblies, each piston assembly including a piston and a pin,
   wherein the pin is slidably engaged by a respective pin receiving hole, and
   wherein the piston has a larger diameter than the pin receiving hole, and
   wherein a bottom of each of the ball receiving holes merges with a portion of a respective one of the pin receiving holes.

15. The pin locking apparatus of claim 14, wherein the pin receiving holes are substantially vertical and the ball receiving holes are angled with respect to the pin receiving holes.

16. The pin locking apparatus of claim 14, wherein the pin locking apparatus has a locking position and an unlocking position, and wherein the balls are positioned approximately at a bottom of the ball receiving holes in the locking position and remote from the bottom of the ball receiving holes in the unlocking position.

17. The pin locking apparatus of claim 16, wherein the balls protrude from a bottom surface of the locking plate when the balls are in the locking position.

18. The pin locking apparatus of claim 14, wherein the locking plate is made from a material with a hardness greater than that of the balls or of pins being locked.

19. The pin locking apparatus of claim 14, wherein the balls have a diameter that is smaller than the pins being held.

20. The pin locking apparatus of claim 14, further comprising a gasket having a plurality of pin receiving hole and a plurality of ball restricting holes, wherein:
   the pin receiving holes of the gasket are aligned with the pin receiving holes of the locking plate,
   the ball restricting holes of the gasket are aligned with a top of the ball receiving holes of the locking plate, and
   the ball restricting holes of the gasket have a smaller diameter than the balls for retaining the balls in the ball receiving holes of the locking plate.

21. The pin locking apparatus of claim 14 wherein said one or more pin locking plates is single pin locking plate, said apparatus further comprising:
   a base plate;
   a cylinder block mounted to the base plate, the cylinder block having a plurality of piston receiving holes;
   a top plate mounted to the pin locking plate and having pin receiving holes, the pin receiving holes of the top plate being aligned with respective ones of the pin receiving holes of the pin locking plate;
   a plurality of piston assemblies slidably mounted within the piston receiving holes, each piston assembly comprising a pin and a piston, the pistons having a greater diameter than a diameter of the pins;
   at least one air pressure channel fluidly connected to the pin receiving holes of the cylinder block; and
   at least one air conduit fluidly connected to the ball receiving holes of the pin locking plate;
   wherein said pin locking plate is mounted to the cylinder block, and wherein said plurality of pin receiving holes of said pin locking plate are aligned with respective ones of the piston receiving holes of the cylinder block.

22. The supporting device of claim 21, wherein each piston assembly is formed from one piece of material.

23. The supporting device of claim 21, wherein the pistons and the pins of the piston assemblies are formed of separate pieces which are assembled together.

24. The supporting device of claim 21, wherein at least one of the pins has a cap of a soft material.

25. The supporting device of claim 21, wherein the base plate contains the at least one air pressure channel which is fluidly connected to the piston receiving holes of the cylinder block.

26. The supporting device of claim 21, wherein the cylinder block contains the at least one air pressure channel which is fluidly connected to the piston receiving holes of the cylinder block.

27. The supporting device of claim 21, wherein the pin locking plate contains the at least one air conduit which is fluidly connected to the ball receiving holes of the pin locking plate.

28. The supporting device of claim 21, wherein the top plate contains the at least one air conduit which is fluidly connected to the ball receiving holes of the pin locking plate.

29. The supporting device of claim 21, further comprising a gasket having a plurality of pin receiving holes and a plurality of ball restricting holes, wherein:
   the pin receiving holes of the gasket are aligned with the pin receiving holes of the pin locking plate and the pin receiving holes of the top plate,
   the ball restricting holes of the gasket are aligned with a top of the ball receiving holes of the pin locking plate,
   the ball receiving holes of the gasket have a smaller diameter than the balls to retain the balls in the ball receiving holes of the pin locking plate, and the gasket is mounted between the pin locking plate and the top plate.

30. The supporting device of claim 29, wherein the gasket is comprised of thin, flat steel.

31. The supporting device of claim 21, further comprising a programmable controller for controlling use of air pressure to actuate the piston assemblies.

32. The supporting device of claim 21, further comprising:
   at least one air compressor connected to a port of the at least one air pressure channel that is fluidly connected to the pin receiving holes of the cylinder block, the at least one air compressor being connected to a port of the at least one air conduit that is fluidly connected to the ball receiving holes of the pin locking plate, and
   a vacuum source connected to a port of the at least one air conduit that is fluidly connected the ball receiving holes of the pin locking plate.

33. The pin locking apparatus of claim 14, wherein said one or more pin locking plates is a single pin locking plate, said apparatus further comprising:
   a base plate;
   a plurality of support posts mounted to the base plate;
   a top plate mounted to the pin locking plate and having pin receiving holes aligned with the respective ones of the pin receiving holes of the pin locking plate;

a plurality of piston assemblies slidably mounted within the pin receiving holes of the pin locking plate and the top plate, each piston assembly comprising a pin and a piston, the pistons having a greater diameter than a diameter of the pins, and wherein the pin locking plate is mounted to the support posts.

34. A pin locking apparatus for use in a supporting device, comprising:

a locking plate having a pin receiving hole and a ball receiving hole, a ball movably contained within said ball receiving hole, and a piston assembly including a piston and a pin, wherein the pin is slidably engaged by a respective pin receiving hole, and wherein the piston has a larger diameter than the pin receiving hole, and wherein a bottom of the ball receiving hole merges with a portion of the pin receiving hole.

35. The pin locking apparatus of claim 34, wherein the ball is pneumatically controlled.

* * * * *

UNITED STATES PATENT AND TRADEMARK OFFICE
CERTIFICATE OF CORRECTION

PATENT NO. : 6,702,272 B2  
DATED : March 9, 2004  
INVENTOR(S) : Charles Moncavage It is certified that error appears in the above-identified patent and that said Letters Patent is hereby corrected as shown below:

<u>Title page,</u>
Item [75], Inventor, delete "Monvavage" and insert therefor -- Moncavage --.

Signed and Sealed this

Seventeenth Day of August, 2004

JON W. DUDAS  
*Acting Director of the United States Patent and Trademark Office*